W. McAFEE & Y. P. TRUE.
AGRICULTURAL BOILER.

No. 189,051.  Patented April 3, 1877.

UNITED STATES PATENT OFFICE.

WILLIAM McAFEE AND YOUNGER P. TRUE, OF CLARENCE, MISSOURI.

IMPROVEMENT IN AGRICULTURAL BOILERS.

Specification forming part of Letters Patent No. 189,051, dated April 3, 1877; application filed August 23, 1876.

*To all whom it may concern:*

Be it known that we, WILLIAM McAFEE and YOUNGER P. TRUE, of Clarence, in the county of Shelby and State of Missouri, have invented a new and useful Improvement in Agricultural Boilers, of which the following is a specification, reference being had to the accompanying drawings.

The invention relates to an improvement in heaters and boilers which are employed for boiling and cooking food for stock and other purposes; and consists in the devices hereinafter specifically described.

The object of the invention is to provide an efficient heater and boiler for the use of agriculturists.

Figure 1:
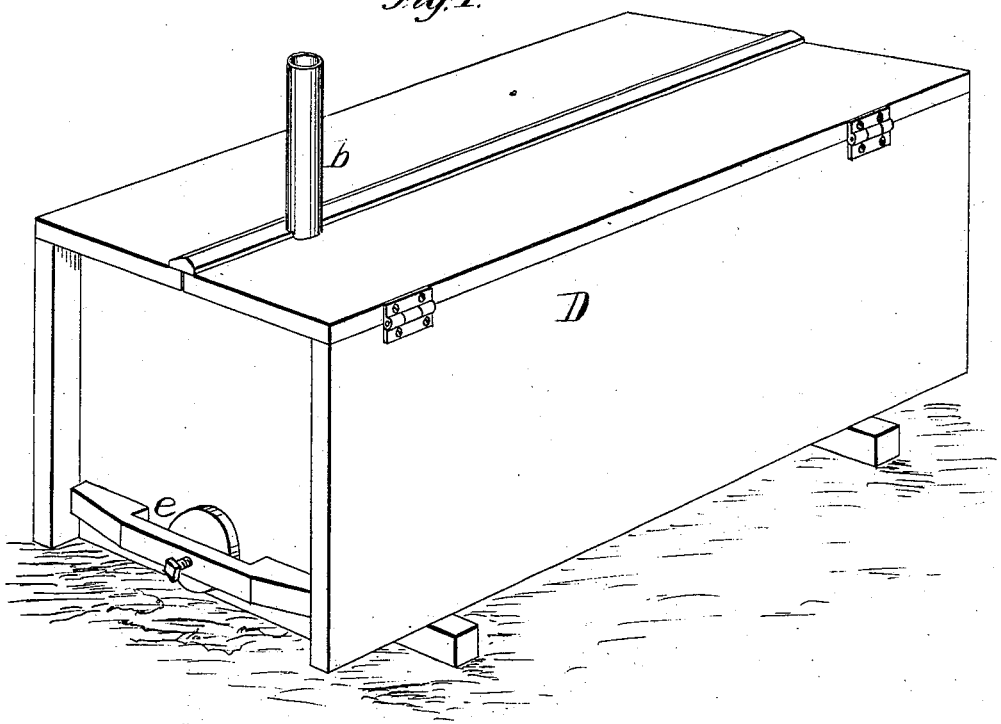
Figure 2:
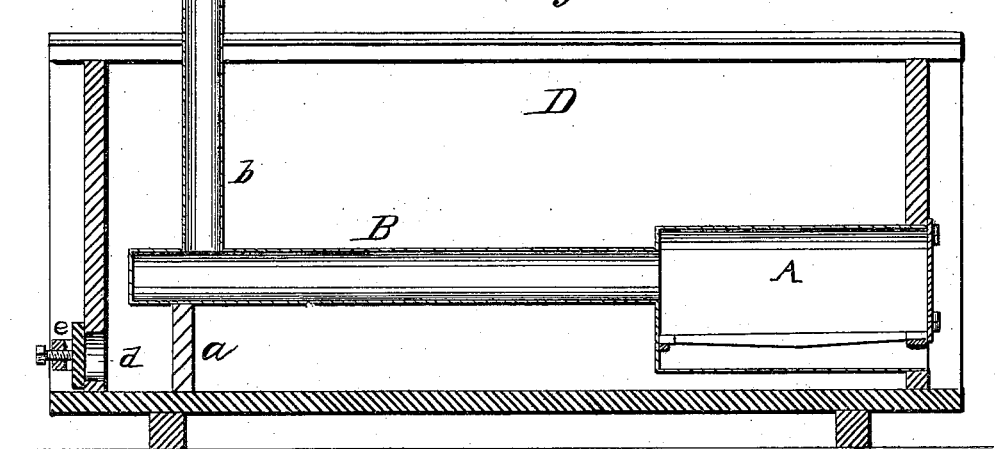

Figure 1 is a perspective view of a device embodying the elements of the invention. Fig. 2 is a central vertical longitudinal section of same.

In the accompanying drawings, A represents a furnace, provided with a door at one end, and the hot-air space or cylinder B at the other, and suspended at its front end by the frame of the tank D, its other end being supported by the standard a, situated near the rear end of the tank, and placed immediately beneath the rear end of the cylinder B, which is provided on its rear end within the tank with the flue b. This flue extends upward through the tank, whereby the heated air passing up through the same is utilized and made to assist in cooking the material within the tank. Thus, a great saving of fuel is effected; besides the food is caused to cook more rapidly.

The tank D is constructed of suitable material and dimensions, its upper part being provided with a lid or cover, and its end with the aperture d, out through which the material, after being cooked, is removed from the tank, and which is provided with a suitable detachable cover, e, constructed as desired, and furnished with a screw or other device for fastening the same in a water-tight manner against the side of the tank.

The furnace A extends but a short distance in the front of the tank, and is preferably constructed flat at the bottom and oval at its sides and top; but it is obvious that it may be made of any suitable configuration.

The tube B is rigidly secured to the end of the furnace A, and extends longitudinally through the tank D until it is in close proximity to the rear end of the same, where it is provided with the flue b.

To cook food, heat water, or boil molasses, it is only necessary to put the material in the tank D with a proper quantity of water, if required, and kindle the fire in the furnace.

It will appear obvious that, the furnace and tube or cylinder extending the length of the tank, and the flue b also placed within the same, the heat will be disbursed evenly through the substance to be cooked, and, also, that a great saving in fuel will be consummated by the use of this tube or cylinder, it requiring but a small quantity of fuel to heat the furnace and fill the cylinder with heated air.

We are aware that devices for agricultural purposes have been made, consisting of tanks provided with heating flues and furnaces; but in all these either the furnace or the smoke-flue has been outside of the tank, or so placed as to evolve the heat unevenly and in greater degree at some parts than others.

We do not therefore claim, broadly, an agricultural steamer and boiler provided with flues and a furnace; but What we do claim, and desire to secure by Letters Patent, is—

The agricultural boiler consisting of the flue b, pipe B, and furnace, provided with an open draft, all wholly within the tank D, having a hinged cover and drain-outlet, d, provided with adjustable stop e, all as and for the uses and purposes substantially as set forth.

In testimony that we claim the foregoing improvement in agricultural boilers, as above described, we have hereunto set our hands.

WILLIAM McAFEE.
YOUNGER P. TRUE.

Witnesses:
C. S. BROWN,
JOSEPH FOWLER.